No. 698,574. Patented Apr. 29, 1902.
W. A. SOPER.
ICE CREAM FREEZER.
(Application filed July 17, 1899.)
(No Model.)
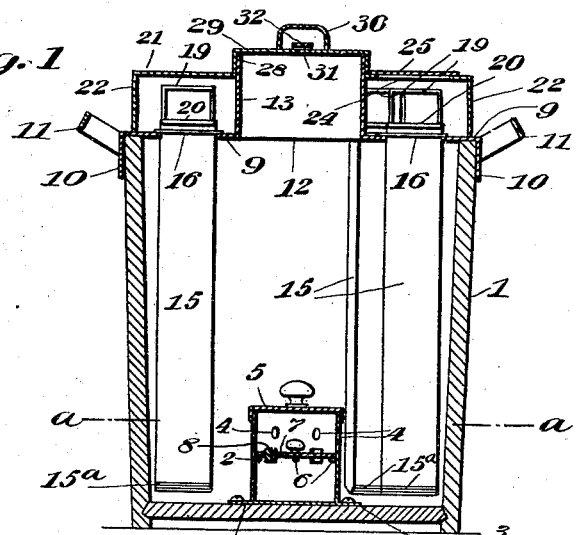
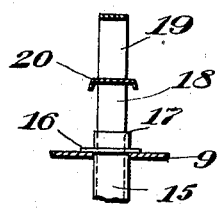 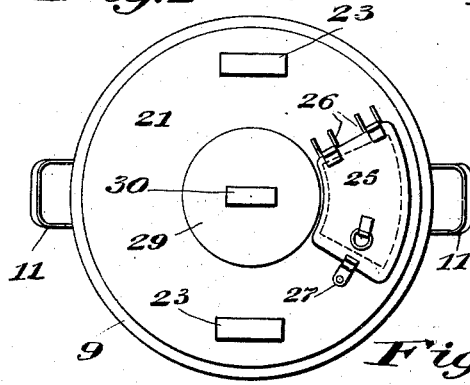 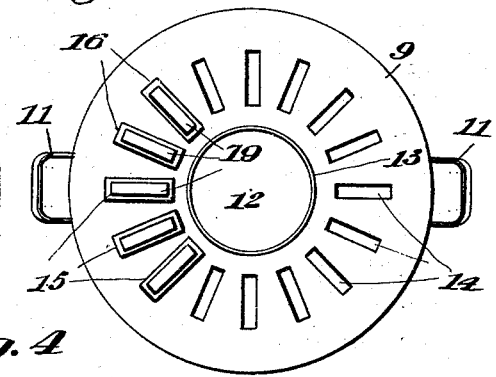
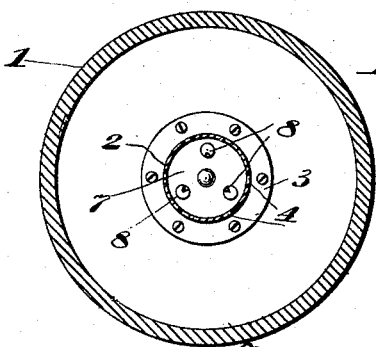 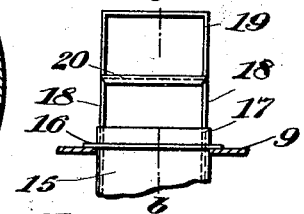
Witnesses
J. D. Howe
Edward Sweeney
Inventor
William Appelton Soper
By James N. Ramsey
his Attorney.
THE NORRIS PETERS CO., PHOTO-LITHO., WASHINGTON, D. C.

UNITED STATES PATENT OFFICE.

WILLIAM APELTON SOPER, OF MAYSVILLE, KENTUCKY, ASSIGNOR OF ONE-HALF TO GEORGE W. SULSER, OF MAYSVILLE, KENTUCKY.

ICE-CREAM FREEZER.

SPECIFICATION forming part of Letters Patent No. 698,574, dated April 29, 1902.

Application filed July 17, 1899. Serial No. 724,029. (No model.)

*To all whom it may concern:*

Be it known that I, WILLIAM APELTON SOPER, a citizen of the United States, residing at Maysville, in the county of Mason and State of Kentucky, have invented certain new and useful Improvements in Ice-Cream Freezers, of which the following is a specification.

My invention relates to certain improvements in ice-cream freezers; and its object is to provide a freezer of a simple and inexpensive nature and of a compact, strong, and durable construction adapted more especially for freezing the cream in block form and capable of operation in a continuous manner to freeze creams of different flavors simultaneously and to furnish a constant supply of ice-cream from a single freezer.

My invention consists in a freezer comprising a tub or receptacle for holding a freezing mixture, means for supplying the freezing mixture without interruption to the freezing process, means for containing the cream to be frozen within said tub or receptacle, and a fumigator for holding a supply of ammonia or other suitable substance, said fumigator being arranged to furnish to all parts of said tub or receptacle a supply of ammonia-gas.

My invention also contemplates certain novel features of the construction, combination, and arrangement of the several parts of the improved ice-cream freezer, whereby certain important advantages are attained and the apparatus is made simpler, cheaper, and otherwise better adapted and more convenient for use, and in the process employed, all as will be hereinafter fully set forth.

The novel features of the invention will be carefully defined in the claims.

In the accompanying drawings, which serve to illustrate my invention, Figure 1 is a vertical section taken axially through a freezer constructed according to my invention, several of the molds being shown in position in the freezer in elevation. Fig. 2 is a plan view of the freezer. Fig. 3 is a view similar to Fig. 2, but showing the outer covers of the freezer removed. Fig. 4 is a sectional view taken transversely through the freezer in the plane indicated by line *a a* in Fig. 1. Fig. 5 is an enlarged fragmentary view showing the upper part of one of the removable molds adapted for use in the freezer. Fig. 6 is an enlarged fragmentary sectional view taken through the upper part of the mold in the plane indicated by line *b b* in Fig. 5.

In the views, 1 indicates the tub or receptacle for containing the freezing mixture, said tub being made in cylindrical form with its upper end open.

2 indicates the fumigator, arranged at the bottom of the tub and made in cylindrical or cup-like form from sheet metal or the like, being provided at its lower part with a projecting annular flange 3 to receive screws by means of which the fumigator is secured to the bottom of the tub. The fumigator 2 is constructed with a series of vents or openings 4, formed near the upper part of its side walls and adapted to permit the ammoniacal fumes or vapors from within to escape through the walls of the fumigator into the freezing mixture of ice and salt water with which the tub 1 is filled. The top of the fumigator 2 is open, but is provided with a lid or cover 5, with which it is closed when the freezer is in use. The inner faces of the walls of the fumigator are also provided, as shown in Fig. 1, with a series of projecting pins 6, on which rests a circular removable sheet-metal diaphragm 7, having a central handle and provided with apertures 8, through which the fumes or vapors of the ammonia pass up into the interior of the fumigator and escape through the ports 4.

9 indicates the lid or cover-plate of the freezer, also made from sheet metal in annular form and provided with an annular depending flange 10, formed about its outer edge and having handles 11 projecting from its opposite sides. The lid or cover-plate 9 is formed with a central circular opening 12, around which is provided an upwardly-extended annular flange or collar 13, which extends up above the upper face of said lid in a cylindrical form. The lid or cover-plate 9 is formed between the flanges 10 and 13 with an annular series of elongated openings 14, as clearly shown in Fig. 3, and adapted for the passage of the molds 15, in which is contained cream to be frozen. The molds 15, as herein shown, are formed from sheet metal in elongated flattened rectangular shape, the molds being of such a length as to depend when inserted in the openings 14 down into the freezing mixture contained in the tub 1. Each mold is provided, as shown in Figs. 1, 5, and 6, with a projecting flange 16 near its upper end or mouth and adapted to rest upon the upper face of the lid or cover-plate 9 around the opening 14, in which the mold is inserted in such a way as to hold the upper edges of the mold, at the mouth thereof, above the surface of the lid or cover-plate to form a projecting lip 17, surrounding the mouth of the mold and serving to keep any liquid which may be splashed upon the cover-plate in the operation of the freezer from entering the mold. The mold is also formed with a removable open frame 18 of rectangular form fitting in the outer part or receptacle of the mold and serving when the cream is frozen as a convenient means of withdrawing the same from the mold. The removable part or frame 18 is extended above the mouth of the mold when inserted therein to form a rectangular handle or bail 19, with which said frame may be removed from the mold, and also when the two parts 15 and 18 of the mold are bound together by the frozen cream said bail serves as a means whereby the mold itself may be readily removed from the opening 14 in the lid or cover-plate 1. The frame 18 is provided below the bail or handle 19 with a flat cover 20, adapted to close the mouth of the mold 18, and said cover 20 is formed with downwardly-bent flanges to take over the edges of the mold at said mouth to form a seal for the same. The mold 15 is formed with a V-shaped lower edge, as clearly shown in Fig. 1, to facilitate the insertion of said mold into the tub 1 through the cracked ice of the freezing mixture contained in said tub.

21 indicates the auxiliary outer cover-plate or shield, also made from sheet metal in annular form, having a central opening and provided with an annular depending flange 22, surrounding it and adapted to rest upon the upper face of the cover-plate 9, outside the openings 14 therein. The flange 22 is of such depth as to hold the shield 21 when in place on the freezer elevated above the bails or handles 19 of the molds, inserted in the openings 14, as clearly shown in Fig. 1. The cylindrical upwardly-extending flange 13 of the cover-plate 9 is of greater depth than the flange 22 of shield 21 and is arranged to pass snugly through the central circular opening in said shield, so as to project above the upper surface of said shield, as shown at 28 in Fig. 1. The shield is provided with oppositely-arranged handles 23 upon its upper face, by means of which it may be readily applied to or lifted off from the cover-plate 9, and said shield is also formed at one side with an opening 24, arranged over the series of openings 14 and molds 15 therein at one side of the cover-plate 9 and through which said molds may be removed or introduced, the opening 24 being normally closed by a cover-plate 25, hinged along one edge, as shown at 26, and provided with a suitable catch 27, by which it may be held in closed position.

The upper open projecting end 28 of the cylindrical flange 13 of the cover-plate 9 is provided with a close-fitting lid or cover 29, having a handle 30, whereby it may be lifted off, and provided with a central vent 31 for the escape of the fumes or vapors after the passage thereof through the freezing mixture in the tub and for the escape of any warm air that may collect in the tub. The vent 31 is protected by a guard-plate 32, extended over it on the outer face of the cover or lid 29, within the handle 30 thereof.

Owing to the circular form of the flanges 10, 13, and 22 of the cover-plate 9 and shield 21, it is evident that these parts are permitted to turn upon the upper edges of the tub 1, whereon the cover-plate 9 rests, and also that the shield 21 is permitted to turn upon the cover-plate 9, so as to bring the opening 24 in position over either of the molds held in the openings 14 of the cover-plate.

In the operation of the freezer a suitable supply of nitrate of ammonia is first poured into the fumigator, after which the diaphragm 7 and cover 5 are applied in position, the vents 8 and 4 permitting the escape of the fumes or vapors of the ammonia from the fumigator to the interior of the tub 1. The cover-plate 9, with molds 15, filled with cream, and shield 21 being in place, the tub is supplied with the freezing mixture of cracked ice and salt, introduced through the central opening 12 of the cover-plate within the flange 13, and sufficient water is poured into the tub to fill the interstices in the ice, thus entirely covering and surrounding the fumigator with the freezing mixture. The cover or lid 29 is then applied to the flange 13, after which the handles 11 are grasped by the operator and a reciprocatory turning movement back and forth is given to the cover-plate 9, so as to bring the molds 15, carried thereby, in close contact with the freezing mixture at all points. The ammoniacal fumes or vapors are thereby freed and, escaping from the fumigator, pass up through the mixture of ice and salt water and act to greatly augment the refrigerative effect produced upon the cream in the molds 15—that is, by adding the nitrate of ammonia to a solution of ice and salt reduces the freezing-point thereof, thereby enabling the solution to dissolve or melt the ice at a point lower than 32° Fahrenheit, and thereby produce a freezing mixture. The fumigator throws off vapor only when the machine is in motion, so that when the machine is not in motion there is no loss of ammonia. By means of the central opening 12 of the cover-plate the freezing mixture can be supplied to the freezing-chamber without the removal of the cover-plate or removal of the molds containing the cream at any time during the process of freezing, thus insuring an uninterrupted freezing for an indefinite time, the molds containing the cream or other substance to be frozen being removable from the freezer singly or as many as may be desired without interference with the freezing process. When it is desired to remove the cream or to examine the molds, this may be done by lifting the hinged lid or cover 25 of the shield, so that access may be had for the removal or examination of the molds through the opening 24 without exposing all of the molds to the outside temperature. One or more of the molds may be readily removed through the opening 24 by means of the handles 19, the shield being capable of being turned upon the cover-plate to bring the opening 24 over any desired mold.

The improved freezer constructed according to my invention is of an extremely simple and inexpensive nature and is especially well adapted for use, since it permits of freezing the cream in bricks or cakes or other form and of different sizes in separate molds which may contain different flavors. The special form of mold shown is also very advantageous, since it permits of being readily removed from the freezer and also provides means for removing the frozen cream in a solid cake or brick from the mold-receptacle. The employment of the ammonia-fumigator also greatly increases the rapidity of the freezing process and renders unnecessary long-continued agitation of the cream, while it freezes the cream in the molds much harder. It will also be obvious from the above description that my improved freezer is capable of considerable modification without material departure from the principles and spirit of the invention, and for this reason I do not wish to be understood as limiting myself to the precise form and arrangement of the several parts herein set forth.

I claim—

1. In an ice-cream freezer, the combination of a tub or receptacle for containing a freezing mixture, means for containing cream in said tub or receptacle and a fumigator arranged at the lower part of the tub or receptacle and adapted to discharge vapors or fumes to the freezing mixture contained therein, substantially as set forth.

2. In an ice-cream freezer the combination of a tub or receptacle for containing a freezing mixture, a cover-plate arranged over said tub and provided with means for supporting a plurality of molds within the tub, handles upon said molds and an auxiliary cover or shield carried by said cover-plate and arranged to house the upper ends of the molds, substantially as set forth.

3. In an ice-cream freezer the combination of a tub for containing a freezing mixture, a cover-plate arranged over the tub and provided with means for supporting a plurality of molds within the tub and auxiliary cover or shield carried by the cover-plate and arranged to house the upper ends of the molds, said shield having an opening for the removal of the molds and being capable of movement on the cover-plate to bring said opening in position over either of the molds, and means to close said opening in the shield, substantially as set forth.

4. In an ice-cream freezer, the combination of a tub for containing a freezing mixture, a plate arranged across the top of the tub and formed with a central opening affording access to said tub, a plurality of molds carried by the plates in annular series about said central opening and depending within the tub, and a fumigator arranged centrally with respect to said series of molds and near the bottom of the tub and adapted to discharge gas or vapors to the freezing mixture within the tub, substantially as set forth.

5. In an ice-cream freezer the combination of a tub for containing a freezing mixture, a plate arranged across the top of the tub and formed with a central opening affording access to said tub, a plurality of molds carried by said plate in annular series about said central opening and depending within the tub and an auxiliary cover or shield mounted to turn in said plate and arranged to house the upper ends of the molds, said shield having an opening for the removal of the molds, substantially as set forth.

6. In an ice-cream freezer the combination of a tub for containing a freezing mixture, a plate arranged across the top of the tub and formed with a central opening affording access to the tub, a plurality of molds carried by the plate in annular series about said central opening and depending within the tub, a fumigator arranged to supply vapors or fumes to the freezing mixture in the tub, and a cover for the central opening in the plate and provided with a vent for the escape of vapors or fumes from the tub, substantially as set forth.

7. In an ice-cream freezer, the combination of a tub for containing a freezing mixture, a plate arranged across the tub, and a series of molds carried by the plate and depending within said tub, said molds being formed with wedge-shaped lower ends, substantially as set forth.

8. In an ice-cream freezer, the combination of a tub, means for containing cream in the tub, and a fumigator consisting of a shell secured to the bottom of the tub and having vents in its side walls, a removable cover for said shell, and a perforated diaphragm supported within the shell, substantially as set forth.

9. In an ice-cream freezer, the combination of a tub, a cover-plate arranged across the top thereof and formed with a central opening and an upwardly-extending flange surrounding said opening, a series of molds carried by the cover-plate, a handle upon each mold and an auxiliary cover or shield having a marginal depending flange adapted to rest on the cover-plate and also formed with a central opening for the passage of the upwardly-extended flange of the cover-plate, said shield being arranged to house the upper ends of the molds, substantially as set forth.

WILLIAM APELTON SOPER.

Witnesses:
J. P. WALLACE,
W. R. WARDER.